(12) United States Patent
Gazelle et al.

(10) Patent No.: US 7,773,031 B2
(45) Date of Patent: Aug. 10, 2010

(54) SIGNAL ACQUISITION AND METHOD FOR ULTRA-WIDEBAND (UWB) RADAR

(75) Inventors: David Gazelle, Kfar-Hess (IL); Amir Beeri, Zoran (IL); Ron Daisy, Raanana (IL)

(73) Assignee: Camero - Tech Ltd., Kfar Netter (IL)

( * ) Notice: Subject to any disclaimer, the term of this patent is extended or adjusted under 35 U.S.C. 154(b) by 624 days.

(21) Appl. No.: 11/577,909

(22) PCT Filed: Jun. 19, 2006

(86) PCT No.: PCT/IL2006/000703

§ 371 (c)(1),
(2), (4) Date: Apr. 25, 2007

(87) PCT Pub. No.: WO2007/029227

PCT Pub. Date: Mar. 15, 2007

(65) Prior Publication Data

US 2009/0201195 A1 Aug. 13, 2009

(30) Foreign Application Priority Data

Sep. 7, 2005 (IL) .................................. 170726

(51) Int. Cl.
*G01S 13/00* (2006.01)
*G01S 7/40* (2006.01)
(52) U.S. Cl. .................. 342/174; 342/159; 342/165; 342/173; 342/175
(58) Field of Classification Search ............. 342/91–93, 342/159–165, 147, 173–175, 195; 341/126, 341/143, 155
See application file for complete search history.

(56) References Cited

U.S. PATENT DOCUMENTS

| 3,422,435 A | 1/1969 | Cragon et al. |
| 3,683,380 A | 8/1972 | Cantwell, Jr. et al. |
| 3,868,685 A | 2/1975 | Wilmot |
| 3,927,405 A | 12/1975 | Poinsard et al. |
| 4,145,743 A | 3/1979 | DiCiurcio |
| 4,301,446 A | 11/1981 | Petit |

(Continued)

FOREIGN PATENT DOCUMENTS

GB 2 218 294 A 11/1989

(Continued)

OTHER PUBLICATIONS

PCT Supplementary European Search Report dated Aug. 8, 2008.

(Continued)

*Primary Examiner*—Thomas H Tarcza
*Assistant Examiner*—Peter M Bythrow
(74) *Attorney, Agent, or Firm*—Browdy and Neimark, PLLC

(57) ABSTRACT

An acquisition channel (20) includes a UWB sampler block (21) coupled to an analog integration block (22) further coupled to a digital integration block (24) via an analog/digital converter (23). For each range cell the UWB sampler block (21) repeatedly samples the received signal by tuning the sampling instants to the range cells to be acquired. The acquisition channel (20) is further coupled to a processor (26) and a database (25).

52 Claims, 3 Drawing Sheets

U.S. PATENT DOCUMENTS

| | | | |
|---|---|---|---|
| 4,672,361 A | | 6/1987 | Kokubo et al. |
| 4,818,955 A | | 4/1989 | Hwang |
| 4,996,529 A | * | 2/1991 | Connell ................ 341/118 |
| 5,077,562 A | | 12/1991 | Chang et al. |
| 5,132,688 A | * | 7/1992 | Shima et al. ............ 342/91 |
| 5,153,593 A | * | 10/1992 | Walden et al. ........... 341/143 |
| 5,221,928 A | | 6/1993 | Dahl |
| 5,241,310 A | * | 8/1993 | Tiemann ................ 341/143 |
| 5,381,151 A | | 1/1995 | Boles et al. |
| 5,457,462 A | * | 10/1995 | Mitsumoto et al. ........ 342/93 |
| 5,601,083 A | | 2/1997 | Anderson |
| 6,029,116 A | | 2/2000 | Wright et al. |
| 6,255,985 B1 | | 7/2001 | Towner, III et al. |
| 6,404,368 B1 | * | 6/2002 | Yamaguchi ............ 341/143 |
| 6,424,279 B1 | * | 7/2002 | Kim et al. ............. 341/143 |
| 2003/0100285 A1 | | 5/2003 | Puglia |

FOREIGN PATENT DOCUMENTS

GB         2218294 A  *  11/1989

OTHER PUBLICATIONS

PCT Notification of Transmittal of the International Search Report and the Written Opinion of the International Searching Authority mailed Jan. 11, 2007.

* cited by examiner

SIGNAL ACQUISITION AND METHOD FOR ULTRA-WIDEBAND (UWB) RADAR

FIELD OF THE INVENTION

The invention relates to radar imaging systems and, more particular, to signal acquisition in imaging systems based on ultra-wide band radars.

BACKGROUND OF THE INVENTION

Ultra-Wideband (UWB) is a term for a classification of signals that occupy a substantial bandwidth relative to their centre frequencies (for example, according to the Federal Communications Commission (FCC) Rules, UWB signal is a signal whose fractional bandwidth (the ratio between its bandwidth to its center frequency) is equal or greater than 0.2 or its bandwidth is equal or greater than 500 MHz.). Their very high bandwidth allows UWB based radar systems to obtain more information about targets, and males it possible to build radar with better spatial resolution compared to conventional radar. Therefore the UWB radar devices are widely implemented for radar-based imaging systems, including ground penetrating radars, wall and through-wall radars, surveillance and medical imaging devices, etc.

For most radar systems, the received signal SNR (signal to noise ratio) is a crucial factor, which determines the detection/imaging performance. A well known approach for improving detection capabilities is to perform coherent integration. In this approach, the received signal is summed up repeatedly (on different transmit/receive cycles), and, as a result, the deterministic (repetitive) part on the signal builds up much faster compared to the noise, thus improving signal SNR; the longer the integration lasts, the larger the SNR improvement.

This problem has been recognized in prior art and various systems have been developed to provide a solution, for example:

U.S. Pat. No. 5,132,688 (Shima et al.) entitled "Pulsed Doppler radar system having an improved detection probability" discloses a pulsed Doppler radar system having an improved detection probability, comprising an antenna unit, a transmitter for transmitting a signal through the antenna unit, a receiver for receiving a signal reflected by a target through the antenna unit to provide a reception signal. A processing unit which receives the reception signal from the receiver determines, in accordance with a range of the target and a signal-to-noise ratio and bandwidth of the reception signal, an optimum integration number which maximizes the detection probability and performs coherent integration on the reception signal by the number of times equal to the determined optimum integration number thereby outputting a signal having a predetermined level. Such a signal is fed to a display and an image of the target can be viewed on a display.

U.S. Pat. No. 5,457,462 (Mitsumoto et al.) entitled "Radar signal processor and pulse Doppler radar system therewith" discloses a radar signal processor for use in a pulse radar system. Reception signals are given from a range divide and output circuit to a plurality of integration point variable coherent integrators, each of which is allocated to a different range domain. The range domain is given to an integration point setting section provided corresponding to each integration point variable coherent integrator. The integration point setting section determines the number of coherent integration points based on the given range domain and sets it in the corresponding integration point variable coherent integrator. The signal resulting from coherent integration by the integration point variable coherent integrator is discriminated to frequencies, and then supplied to any square detector for square detection for each frequency component. Square detection output is fed into a CFAR detector, which then makes its false alarm rate constant for a supply to a display, etc.

SUMMARY OF THE INVENTION

There is a need in the art to provide for a new system and method of signal acquisition in UWB radar imaging system with configurable signal-to-noise ratio and dynamic range. The invention, in some of its aspects, is aimed to provide a novel solution capable of providing desired SNR profile and decreasing the requirement for dynamic range and rate of analog to digital conversions and other digital electronics.

In accordance with certain aspects of the present invention, there is provided a signal acquisition system capable of integrating at least one received signal whereby compensating a signal loss, the system comprising:
 (a) at least one sampler configured to sample the received signal and to provide samples of different range cells;
 (b) at least one analog integrator coupled to the sampler and configured to integrate the said samples whereby compensating at least part of the signal loss and giving rise to analog samples;
 (c) at least one analog/digital converter coupled to the analog integrator and configured to convert said analog samples into digital samples;
 (d) at least one digital integrator coupled to the analog/digital converter and configured to integrate said digital samples.

In accordance with further aspects of the present invention, there is provided a method of signal acquisition with integrating at least one received signal whereby compensating a signal loss; the method comprising:
 (a) sampling the received signal giving rise to samples of different range cells;
 (b) analog integrating of said samples whereby compensating at least part of the signal loss and giving rise to analog samples;
 (c) analog/digital converting said analog samples into digital samples;
 (d) digital integrating said digital samples.

The system and method are designated for use with radar and, in particular, with ultra-wideband radar. According to certain aspects of the present invention the signal loss may be caused by at least one of the following: a free space propagation path loss depending on the range, an obstacles-originated loss and a loss caused by variations of radar cross section. The compensation of the signal loss via integration may be provided for improving the signal to noise ratio (SNR) of the received signals.

In accordance with further aspects of the present invention, for samples of at least one range cell, the analog integrator is configured to provide $N_a$ analog integration cycles, the digital integrator is configured to provide $N_d$ digital integration cycles and overall number N of integration cycles for said samples substantially complies with the equation $N=N_a \times N_d$. According to further aspects of the present invention, the overall number of integration cycles and/or number of analog and/or digital integrations vary for samples of different range cells, for example, in accordance with desired SNR profile, frame rate of the radar and/or desired dynamic range.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EXEMPLARY EMBODIMENTS

In the following detailed description, numerous specific details are set forth in order to provide a thorough understanding of the invention. However, it will be understood by those skilled in the art, that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as, processor, computer, apparatus, system, sub-system, module, unit, device (in single or plural form) for performing the operations herein. This may be specially constructed for the desired purposes, or it may comprise a general purpose computer selectively activated or reconfigured by a computer program stored in the computer. Such a computer program may be stored in a computer readable storage medium, such as, but not limited to, any type of disk including optical disks, CD-ROMs, flash memory (e.g. Disk-on-Key), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Also it should be noted that the terms "range cell", "sampling phase", and "sampling instant" used in this patent specification are all equivalent and can freely be interchanged.

Figure 1:
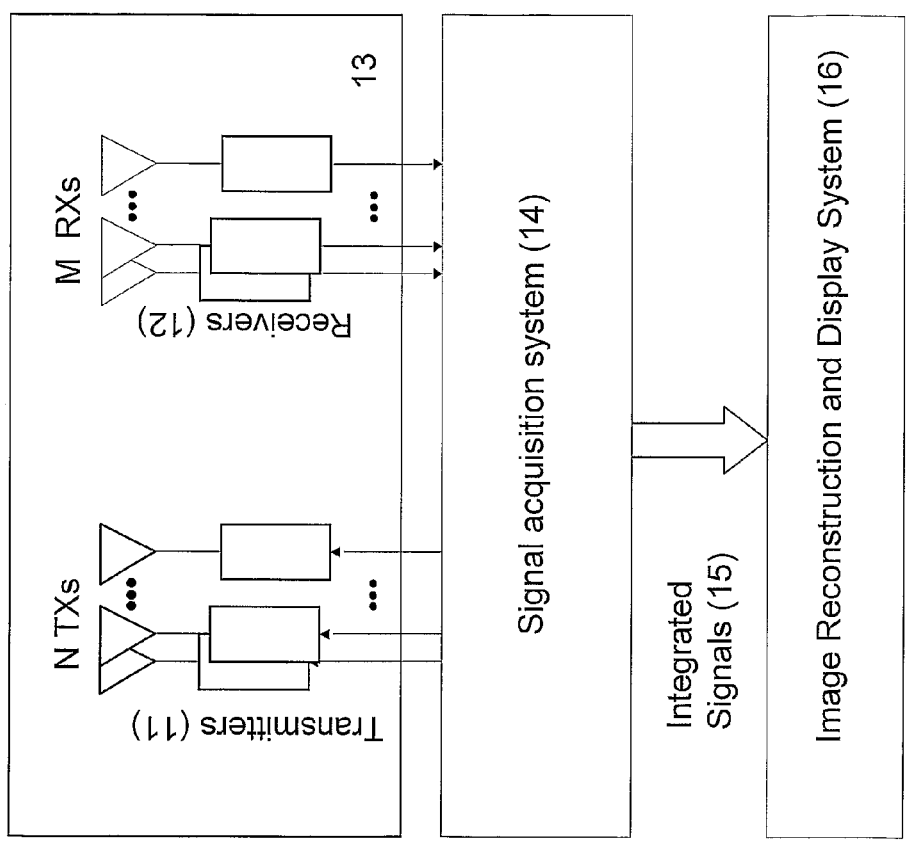
FIG. 1 is generalized block diagram of radar imaging system as known in the art.

Attention is drawn to FIG. 1, illustrating a generalized diagram of a UWB radar imaging system as known in the art.

The UWB radar imaging system comprises $N \geq 1$ transmitters 11 and $M \geq 1$ receivers 12 arranged in (or coupled to) an antenna array 13. At least one transmitter transmits a pulse signal (or other form of UWB signal, such as M-sequence coded signal) to a space to be imaged and at least one receiver captures the scattered/reflected waves. To enable high quality imaging, sampling is provided from several receive channels. The process is repeated for each transmitter separately or simultaneously with different coding per each transmitter (e.g. M-sequence UWB coding). The received signals are transferred to a signal acquisition system 14 coupled to the antenna 13.

The signal-to-noise ratio (SNR) of the received signal decreases with the target range due to increasing free space propagation of the waves. It is well known that integrating a signal for N cycles amplifies the signal by a factor N, and the noise root mean square (RMS) amplitude by a factor $\sqrt{N}$. Therefore, integrating the signal over multiple reception cycles may compensate signal losses and improve the SNR. The signal acquisition system is capable of receiving the signals from a plurality of receivers, of providing the integration of the received signals and of controlling the signal acquisition process.

The resulting integrated signals 15 (typically from all receivers for each transmitter) are transferred to an image reconstruction and display system 16 coupled to the signal acquisition system. The image reconstruction may be provided by using different appropriate techniques, such as, for example, ellipsoidal back-projection (e.g. see U.S. Pat. No. 5,601,083 (Anderson) entitled "Real time 3D imaging device using filtered ellipsoidal back projection").

In many radar systems the signal acquisition system 14 provides integration by way of a digital sampling. In this case the received signal is sampled on a uniform grid over the time domain, at a given sampling rate (obeying the Nyquist criterion), and converted to discrete digital samples. In order to achieve required SNR, the signal sampling at a given time instant is repeated several times, and the digitized signal is integrated using well known digital signal processing techniques.

The signal losses in the radar systems may be caused by several reasons. For example, according to the scattering theory of waves, the power of a received signal is attenuated by 12 dB for each doubling of a target range (this stems from the fact that the received power is inversely proportional to the 4'th power of the target range). Additionally, the scene to be imaged can be located behind some obstacles (e.g. walls or underground environment) that may introduce additional loss which can reach 30 dB and even higher. The magnitude of scattering for different targets can also vary, and typical imaging system should take a range of 20 dB and even higher for expected variations of targets radar cross-section (RCS). Therefore UWB radar systems require a high dynamic range of the signal acquisition system, which particularly should be handled by an analog/digital converter (ADC). For example, the dynamic range in a signal acquisition system designed to work with a target range from 1 m to 8 m shall be about 86 dB, and in a system designed to work with a target range from 1 m to 32 m the dynamic range shall be about 110 dB, etc.

In cases when real-time performance is crucial (e.g. real-time radar imaging systems, critical radar systems, etc.), the signal acquisition period is bound by the required imaging frame rate or detection responsiveness, and the signal acquisition must be completed within the imaging frame duration. It means that within a frame period, the number of transmission/reception cycles required for integration must not exceed the total number of transmitted pulses within the frame duration (hereinafter referred as the maximal integration number) defined by the transmission pulse repetition frequency (PRF), and the number of transmitters (N). In many cases this maximal integration number is not enough to achieve a required SNR.

A possible way to cope with this constraint is to perform a parallel sampling, when at each receive cycle the received signal is sampled on L>1 different instants. Such an approach will shorten the total signal acquisition time by a factor L. The price paid for this parallelism is a need for very fast ADC samplers (one per each receive channel), which also have to be very accurate (having enough bits) in order to fit the required dynamic range, and very fast digital electronics designed to pump the samples from the plurality of ADCs. Such samplers and digital electronics, turn out to be expensive and high power consumers.

The present invention, in some of its aspects, is aimed to decrease the requirement for dynamic range and rate of the ADC and other digital electronics.

Note that the invention is not bound by the specific UWB radar structure described with reference to FIG. 1. Those versed in the art will readily appreciate that the invention is, likewise, applicable to any other UWB radar. Also it should be noted that the functionality of the plurality of physical transmitters and receivers may be also provided by synthetic aperture radar techniques.

Figure 2:
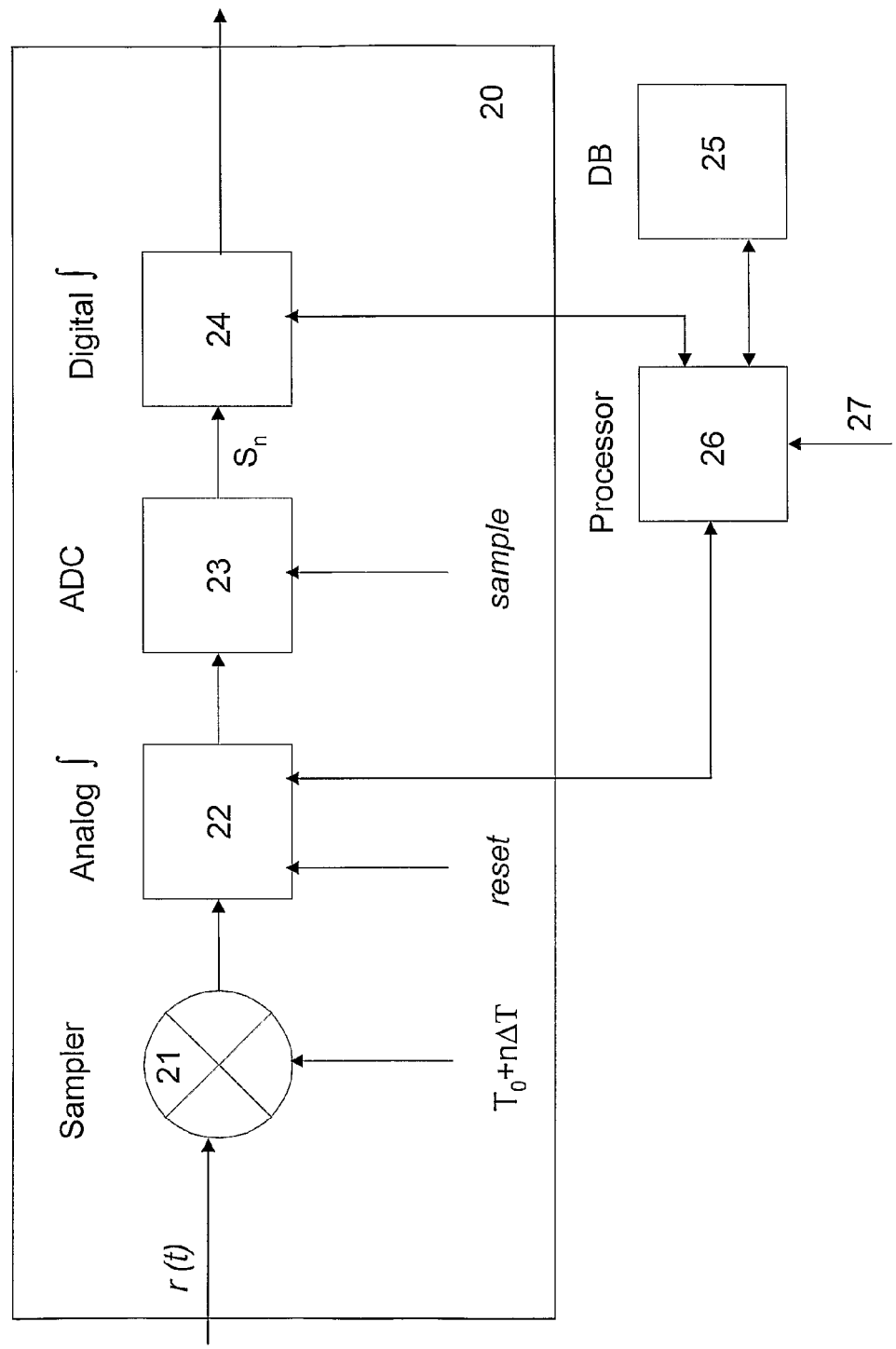
FIG. 2 is generalized diagram of a signal acquisition system in accordance with certain embodiments of the present invention.

Bearing this in mind, attention is drawn to FIG. 2, illustrating generalized diagram of the signal acquisition system 14. In accordance with certain embodiments of the present invention the signal acquisition system includes a UWB sampler block 21 coupled to an analog integration block 22 further coupled to a digital integration block 24 via an analog/digital converter (ADC) 23. The sampler block, the analog integration block, the ADC and the digital integration block may constitute an acquisition channel 20. Typically, each receiver is provided with a separate acquisition channel.

If a target is static or moving considerably slowly (compared to the shortest transmitted wavelength during a frame interval), we can assume that the received signal r(t) is a periodic one, with a period T equal to 1/PRF, where PRF is the transmission pulse repetition frequency. For each range cell the sampler block 21 repeatedly samples the received signal r(t) by tuning the sampling instants to the range cells to be acquired. As illustrated in FIG. 2, the $n^{th}$ sampling phase corresponds to a target range of $n\Delta Tc/2$ (where c is the speed of light in vacuum, $\Delta T$ is the sampling time interval; $T_0$ in the figure corresponds to the time of transmission of short (UWB) pulse by selected transmitter in the current transmit/receive cycle. The factor of 2 is due to the round trip of the scattered wave). The sampled signal is fed into the analog integration block, which shall be reset before the beginning of acquisition of each range cell. The sampling and analog integration process is repeated for desired number of cycles as will be detailed below.

The output signal from the analog integration block is converted into a digital sample by the analog/digital converter 23. The stream of digital samples $S_n$, corresponding to the integrated signal received at a correspondent $n^{th}$ range cell is transferred to the digital integration block 24. This block provides further signal integration, by means of discrete time signal processing.

In accordance with certain embodiments of the present invention, the analog integration block is configured to provide integration enabling compensation of at least part of the signal losses, while the digital integration block is configured to provide the rest of the desired compensation. In certain embodiments of the invention the analog integration block is configured to substantially compensate the nominal free space propagation path loss and the digital integration block is configured to compensate, for example, obstacle-originated losses, RCS variations, etc. In certain embodiments of the invention at least some of obstacle-originated losses and/or expected RCS variations may be compensated by the analog integration block. In certain embodiments of the present invention the analog integration block may compensate only a part of propagation path losses, wherein the rest of desired compensation of signal losses may be compensated by the digital integration block.

In accordance with certain aspects of the present invention, the integration is provided with variable number of integration cycles in accordance with range (reception time) and desired SNR profile (desired values of SNR for different range cells for a given radar cross section) or signal loss compensation. For example, to achieve the range-independent SNR profile for a predefined target RCS, the near range cells will be integrated with smaller number of integration cycles compared to far ones. For yet another example, to maximize SNR for a sub-range of a special interest under constrains of limited overall integration time, the number of integration cycles for corresponding range cells may be increased on account of integration of other range cells.

The term "integration plan" used in this patent specification, should be expansively construed to cover any kind of pre-defined relationship between a number of integration cycles and a range/reception time (range cell index). The integration plan may be configured, for example, to desired SNR profile and/or to desired compensation of signal losses.

In certain embodiments of the present invention, the acquisition system 14 may comprise a database 25 and processor 26 operatively coupled with the digital integration block 24 and/or the analog integration block 22. Those skilled in the art will readily appreciate that functionality of the database and the processor or parts thereof may be integrated with one or more other blocks of the signal acquisition system (e.g. with the digital integration block). The database may comprise, for example, pre-calculated integration plan(s) (e.g. for range-independent SNR profile, for maximized SNR per a selectable sub-range, etc.). The numbers of integration cycles may be calculated as detailed below based on known dependency between the nominal propagation path loss and the target range/reception time. In certain embodiments of the present invention the database may further comprise pre-calculated numbers of integrated cycles required for desired compensation of other types of signal losses, for example, caused by pre-defined obstacle. The obstacles may be predefined in accordance with the nature of the obstacle and/or expected loss. In certain embodiments of the present invention the processor may be configured to facilitate calculating the required numbers of integration cycles. The calculation may be also provided with the help of adaptive and/or learning algorithms, and the processor, accordingly, will comprise external interface 27 for obtaining data, for example, from image reconstruction system, from a user, etc. These adaptive/learning algorithm as may complement the pre-calculated integration plan(s), e.g. by enabling compensation of propagation path loss in real conditions (e.g. for airborne radars) or replace (partly or fully) the pre-calculated integration plan(s) by providing on-demand and/or on-line calculations of the required integration.

The number of integration cycles N required to increase SNR from some initial value $SNR_0$ to a target value $SNR_t$ is given by the following equation (SNRs are assumed to be given in dB):

$$N = 10^{(SNR_t - SNR_0)/10} \qquad (1)$$

According to a well known radar equation [see for example "Electromagnetic Wave propagation, Radiation, and Scattering", by A. Ishimaru, Prentice Hall], for a given target with a fixed RCS, the SNR of a received echo signal depends on reception time t as follows:

$$SNR(t) = SNR(t_0) - 40*\log_{10}(t/t_0) \text{ [dB]} \qquad (2)$$

where $SNR(t_0)$ is the SNR at the starting receive time to $t_0$.

These two equations facilitate calculation of an integration plan in accordance with required SNR as a function of receiving range (SNR profile). For example, the integration plan for range-independent $SNR_t$ profile (for a target with a fixed RCS) is defined as:

$$N(t) = \left(\frac{t}{t_0}\right)^4 10^{[SNR_t - SNR(t_0)]/10} \qquad (3)$$

$$\equiv N_0 \left(\frac{t}{t_0}\right)^4$$

where N(t) is the number of required integration cycles for different range cells (reception time) and $N_0$ is the number of integration cycles for $t=t_0$, given by:

$$N_0 = 10^{[SNR_t - SNR(t_0)]/10}.$$

This integration plan enables compensation of the free space nominal propagation path losses and facilitates range-independent SNR profile. In accordance with certain embodiments of the present invention the above integration plan is predefined and stored in a database comprised in the signal acquisition system. It has to be noted that an integration plan should be designed for each transmitter/receiver couple. In many cases, when the antenna array aperture is smaller compared to the range under consideration, the integration plan can be the same for all receivers.

By way of non-limiting example, the advantages of some aspects of the present invention will be illustrated in case of integration plan with range-independent SNR profile. It should be noted that the invention is not bound by this illustrated case and the following calculations may be done in a similar manner for any other integration plan.

As follows from Eq. 3, the gains for the signal and the noise may be described as the following function of reception time (or range):

$$G_{signal}(t) = N_0 \left(\frac{t}{t_0}\right)^4 \qquad (4)$$

$$G_{noise}(t) = \sqrt{N_0} \left(\frac{t}{t_0}\right)^2$$

Accordingly, since the received signal amplitude v (for a given RCS without noise) is proportional to $$v(t) \propto v_0 \left(\frac{t_0}{t}\right)^2$$

(the receive power is inversely proportional to $t^4$ thus the amplitude is inverse proportional to $t^2$), the signal amplitude $v_{i_s}$, and RMS noise amplitudes $v_{i_N}$ at the output of an integrator operated according to the integration plane of Eq. 3, are expected to, respectively, be:

$$v_{i_s}(t) = v_0 N_0 \left(\frac{t}{t_0}\right)^2 \qquad (5)$$

$$v_{i_N}(t) = v_{N_{rms}} \sqrt{N_0} \left(\frac{t}{t_0}\right)^2$$

where $v_{N_{rms}}$ is the additive white noise RMS amplitude.

From Eq. 5 it can be seen that constant SNR was achieved, and the integrated signal (and noise) level turns out to be increasing with range. Being implemented with the analog integrator only, this integration plan requires a large number of bits in order to cope with the extended signal dynamic range in the ADC input. As was illustrated with reference to FIG. 1, a similar problem arises when implementing the integration plan using digital integrator only. In view of that, in accordance with certain aspects of the present invention, it is proposed to split the integration process into two parts: an analog integration followed by a digital integration. Such approach facilitates an additional degree of freedom, as the integration plan may be designed for two separate integrators according to different criteria, e.g. to minimize signal dynamic range at the input of the ADC (thus enabling selection of cheap components), to get adequate SNR at the output of the digital integrator, etc.

In accordance with certain embodiments of the present invention, the overall number of integration cycles N(t) is split into $N_a(t)$ analog integration cycles and $N_d(t)$ digital integration cycles, wherein $N_a(t) \times N_d(t) = N(t)$. For a case when $N_a(t) = N_d(t) = \sqrt{N(t)}$, the amplitude of received signal at the output of the analog integration block is given by: $v_{i_s}(t) = v_0 \sqrt{N_0}$. It can be seen that, according to the proposed integration plan, the signal received from a target with a given RCS becomes range independent after the analog integration. Thus, the free space path loss was compensated, and the expected signal dynamic range at the input of the ADC port is minimized. For example, the ADC dynamic range requirements have been seriously reduced from 86-110 dB described with reference to FIG. 1 to less than, in some environments, 50 dB, where e.g. 30 dB is contributed by obstacle-caused loss variations, and 20 dB is by diversity of targets RCS.

As will be further detailed with reference to FIG. 3, in accordance with certain embodiments of the present invention, the analog to digital conversion of the analog integrator output may be done once for each period of analog integration. Thus, the required rate of ADC conversions may be considerably reduced for integration plans with the number of analog integrations strictly greater than 1. Therefore certain aspects of the present invention facilitate using relatively low-cost slow ADC. As the signal acquisition power consumption is proportional to the ADC conversion rate, it can also be reduced in accordance with certain embodiments of the present invention.

Those skilled in the art will readily appreciate that the invention is not bound by the configuration described in reference of FIG. 2; equivalent and/or modified functionality may be consolidated or divided in another manner.

The integration plan may be calculated and implemented in several manners; some of them are detailed below by way of non-limiting example.

1) Off-line nominal integration plan calculation based on a priori known information about fixed losses and/or noise sources expected to be present during system operation. This information is taken into account during the system design phase or its preparation for usage. The a priori information is generally given by the following:

$$SNR(t) = F_1(t)$$

$$P(t) = F_2(t)$$

$$FR \qquad (6)$$

where SNR(t) is the expected SNR vs. reception time (or range) given by the a priori known function $F_1(t)$, P(t) is the expected receive power at reception time t (corresponding to a target of a given RCS located at range ct/2) given by the a priori function $F_2(t)$, and FR is the required imaging frame rate. Both $F_1(t)$ and $F_2(t)$ can be supplied using a mathematical representation (e.g. as in the example shown in Eq. 2) or as a table. In general, $F_1(t)$ depends on $F_2(t)$, since the received signal SNR depends on the received power and the receiver front-end additive noise profile—$F_1(t)=F_2(t)/P_{noise}(t)$, where $P_{noise}(t)$ is the additive noise power profile (in a typical situation the noise stems from thermal sources at the receiver front-end, and thus its profile $P_{noise}(t)$=const). Additional information may be required for calculating the integration plan as follows:

The SNR profile goal, $SNR_r(t)$: the required integrated signal SNR vs. reception time (or range) is given;

The admissible maximum ADC input voltage (the power above which the ADC saturates)–$V_{max}$(ADC);

$A_{FE}$—front end gain (between antenna and ADC with no integration);

$Z_0$—front end characteristic impedance;

PRF: the system transmission pulse repetition rate.

Using these equations the integration plan may be calculated according to the following equations:

$$N_a(t) \leq \frac{V_{max}(ADC)}{A_{FE}\sqrt{Z_0 P(t)}} \qquad (7)$$

$$N_d(t) = \frac{N(t)}{N_a(t)}, \qquad (8)$$

where N(t) is the total integration plan given, according to the required integrated signal SNR profile, by:

$$N(t) = 10^{[SNR_r(t) - F_1(t)]} \qquad (9)$$

subject to the constraint:

$$\sum_t N(t) \leq PRF/FR \qquad (10)$$

This constraint ensures that the total number of cycles used to acquire the signal does not exceed the number of transmitted pulses in frame duration. In cases when this constraint is not satisfied, either the system PRF may be increased or the imaging frame rate may be decreased.

In accordance with certain aspects of the present invention, this integration plan may provide more efficient utilization of the ADC bits, and produce an integrated signal with the desired SNR profile ($SNR_r(t)$). It should be noted that due to the fact that $N_a(t)$ and $N_d(t)$ are integers, in cases when their calculation yield non-integer values, the result should be rounded to the closest integer, subject to $N_a(t)$, $N_d(t) \geq 1$ (at least one cycle of integration for each range cell).

2) On-line setting of the integration plan by a user via a user interface enabling a user to set the integration plan ($N_a(t)$ and $N_d(t)$). For example, during the system operation, the user can recognize a sub-range with poor imaging or detection performance. The user may enhance the system performance at this sub-range by changing the integration plan in a manner providing more transmission cycles to be used for integrating the received signal at this sub-range.

3) On-line automatic adaptive integration plan including special purpose algorithms, capable of adapting the integration plan to a predefined goal (e.g. by means of feedback from the integrated received signals and/or reconstructed images). For example, during the system operation, the processor/database may collect statistics about integrated signal received power vs. range. A possible outcome of these statistics might be, e.g., an abrupt decrease at some range (corresponding to reception time denoted by t') in the mean received power; this change might be related to an existence of an obstacle at the corresponding range. In order to better utilize the ADC bits, the processor may use these algorithms to increase $N_a(t)$ for t>t' such that the observed discontinuity will vanish. Also here $N_a(t)$ and $N_d(t)$ are related through Eq. 8 and the constraint given in Eq. 10 has to be fulfilled.

Figure 3:
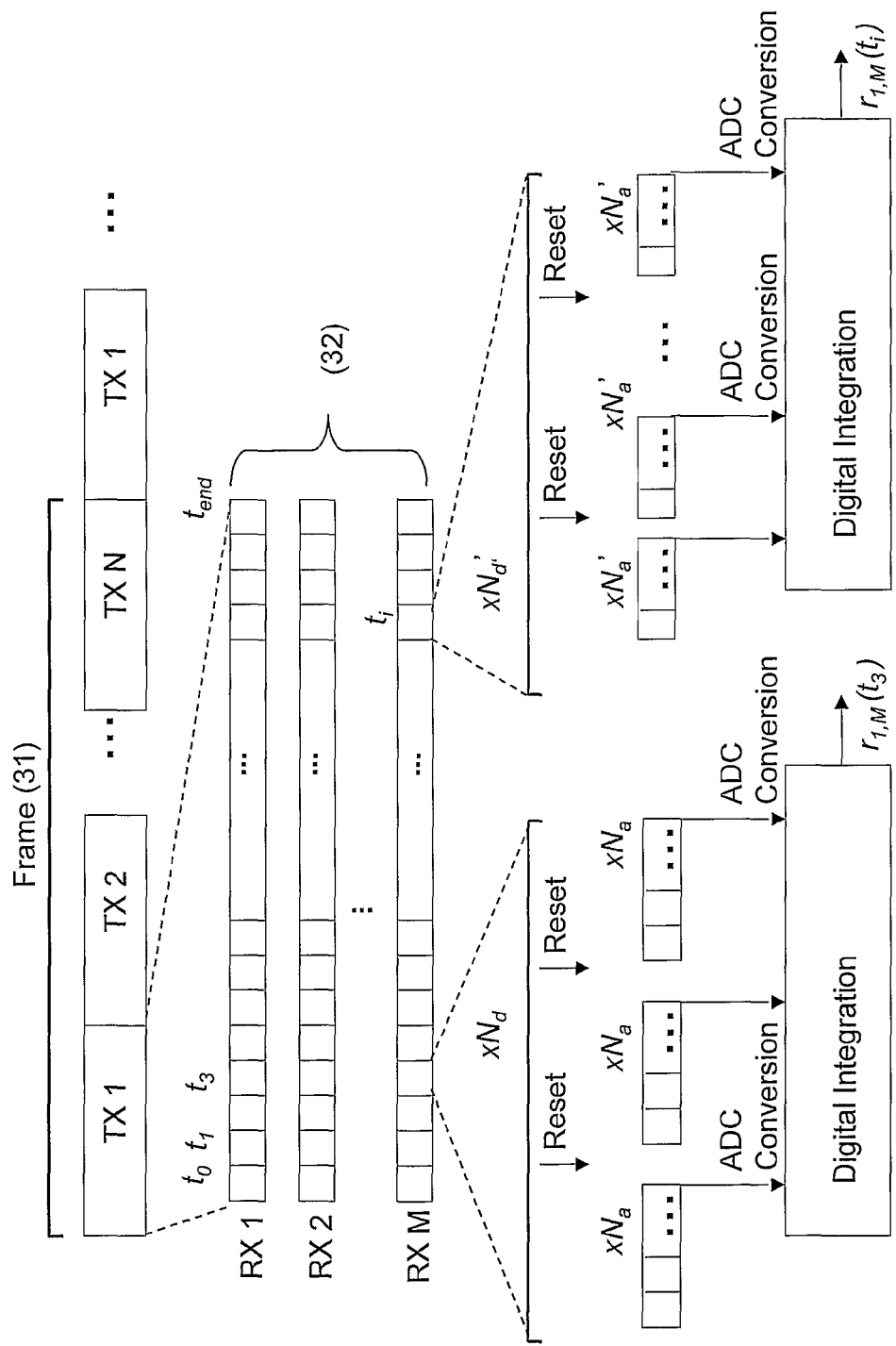
FIG. 3 is generalized diagram of operation of signal acquisition system in accordance with certain embodiments of the present invention.

Attention now is drawn to FIG. 3 illustrating, by way of non-limiting example, generalized diagram of operation of the signal acquisition system in accordance with certain embodiments of the present invention.

A signal for each transmitter (TX1, TX2, etc.) is captured sequentially during a frame 31 in a manner enabling, for each transmitter, acquiring the received signals 32 for the entire range. Per each transmitter the different simultaneously sampled range cells ($t_0$, $t_1$, etc.) are integrated for all receivers (RX1, RX2, etc.), wherein for each range cell a number of $N_d$ digital integrations is performed on $N_a$ times analogically integrated samples. Prior to each analog integration section, the analog integrators (typically one per receiver) are reset. In FIG. 3, $r_{1,M}(t_3)$ and $r_{1,M}(t_i)$ stand for the integrated received sample corresponding to the received signal at receiver M at, accordingly, time $t_3$ and $t_i$ as a result of transmission from the transmitter TX1. In accordance with the integration plan illustrated in the FIG. 3 by way of non-limiting example, the number of integration cycles ($N_d$, $N_a$, etc.) differs for different range cells.

It should be noted that other signal acquisition schemes are possible. For example, the frame might be captured sequentially, range cell after range cell (in an increasing order), such that each range cell runs sequentially over all transmitters.

It will also be understood that the system according to the invention, may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

It is also to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception, upon which this disclosure is based, may readily be utilized as a basis for designing other structures, methods, and systems for carrying out the several purposes of the present invention.

Those skilled in the art will readily appreciate that various modifications and changes can be applied to the embodiments of the invention as hereinbefore described without departing from its scope, defined in and by the appended claims.

The invention claimed is:

1. A signal acquisition system configured to be used with an ultra-wideband radar and capable of integrating at least one received signal whereby provided a desired compensation of a signal loss; the system comprising:
    (a) at least one sampler configured to sample the received signal and to provide samples of different range cells;
    (b) at least one analog integrator coupled to the sampler and configured to integrate said samples during $N_a>1$ integration cycles whereby providing compensation of at least part of the signal loss and giving rise to analog integrated samples;
    (c) at least one analog/digital converter coupled to the analog integrator and configured to convert said analog integrated samples into digital samples;
    (d) at least one digital integrator coupled to the analog/digital converter and configured to integrate said digital samples during $N_d$ digital integration cycles whereby substantially providing the rest of desired signal loss compensation.

2. The system of claim 1 wherein the radar is ultra-wideband radar.

3. The system of claim 1 wherein the compensation of the signal loss is provided for improving a signal to noise ratio (SNR).

4. The system of claim 1, wherein the signal loss is caused by at least one of the following: a free space propagation path loss depending on the range, an obstacles-originated loss and a loss caused by variations of radar cross section.

5. The system of claim 4 wherein the analog integrator is configured to compensate at least part of the free space propagation path loss.

6. The system of claim 4 wherein the analog integrator is configured to substantially compensate the nominal free space propagation path loss.

7. The system of claim 4 wherein the analog integrator is configured to compensate at least part of the obstacle-originated loss.

8. The system of claim 4 wherein the analog integrator is configured to compensate at least part of the loss caused by variations of radar cross section.

9. The system of claim 1 wherein the number $N_a$ of analog integration cycles is selected in accordance with a difference between dynamic range of the signal and an available dynamic range of the analog digital converter.

10. The system of claim 1 wherein an overall number of integration cycles varies for samples of different range cells.

11. The system of claim 10 wherein, for samples of each range cell, an overall number of integration cycles N(t) defined by an integration plan is for different range cells is split into $N_a(t)$ of analog integration cycles and $N_d(t)$ of digital integration cycles substantially complying the equation $N(t)=N_a(t) \times N_d(t)$.

12. The system of claim 11 wherein the defined by an integration plan number N(t) of integration cycles for different range cells substantially complies with the following equation:

$$N(t) = \left(\frac{t}{t_0}\right)^4 10^{[SNR_t-SNR(t_0)]/10}$$
$$\equiv N_0 \left(\frac{t}{t_0}\right)^4$$

where $t_0$ is a starting receive time, and $N_0$ is the number of integration cycles for $t=t_0$, given by: $N_0=10^{[SNR_t-SNR(t_0)]/10}$.

13. The system of claim 11 wherein the respective numbers of analog and digital integration cycles is configured in accordance with a desired SNR profile.

14. The system of claim 13 wherein the number of analog integration cycles is configured to provide a range independent signal.

15. The system of claim 11 wherein a number of integration cycles for samples of given range cells is less than a number of integration cycles for samples of more distant range cells.

16. The system of claim 13 wherein the desired SNR profile is maximized for desired sub-range.

17. The system of claim 16 wherein the desired sub-range is predefined.

18. The system of claim 11 wherein said number of integration cycles is configured in accordance with a frame rate of the radar.

19. The system of claim 1 wherein the analog integrator is configured to provide integration with a number of integration cycles variable for samples of different range cells.

20. The system of claim 1 wherein the analog integrator is configured to provide integration with a number of integration cycles in accordance with a dynamic range of the analog/digital converter.

21. The system of claim 1 wherein the analog integrator is configured to provide integration with a number of integration cycles in accordance with conversion rate of the analog/digital converter.

22. The system of claim 1 comprising a database storing data related to a pre-defined relationship between numbers of analog and digital integration cycles and different range cells.

23. The system of claim 22, wherein said relationship is adapted to desired SNR profile.

24. The system of claim 1 comprising a processor configured to execute at least one algorithm for adapting numbers of analog and digital integration cycles for samples from different range cells in accordance with a desired SNR profile.

25. The system of claim 1 comprising a processor configured to execute at least one learning algorithm facilitating configuration of numbers of analog and digital integration cycles for samples of different range cells in accordance with a desired SNR profile.

26. A method of signal acquisition in an ultra-wideband radar with integrating at least one received signal whereby providing a desired compensation of a signal loss; the method comprising:
    (a) sampling the received signal giving rise to samples of different range cells;
    (b) analog integrating of said samples during $N_a>1$ analog integration cycles whereby providing compensation of at least part of the signal loss and giving rise to analog integrated samples;
    (c) analog/digital converting said analog integrated samples into digital samples;
    (d) digital integrating said digital samples during $N_d$ digital integration cycles whereby substantially providing the rest of desired signal loss.

27. The method of claim 26 wherein the radar is ultra-wideband radar.

28. The method of claim 26 wherein the compensation of the signal loss is provided for improving a signal to noise ratio (SNR).

29. The method of claim 26, wherein the signal loss is caused by at least one of the following: a free space propagation path loss depending on the range, an obstacles-originated loss and a loss caused by variations of radar cross section.

30. The method of claim 29 wherein the analog integrating enables to compensate at least part of the free space propagation path loss.

31. The method of claim 29 wherein the analog integrating enables to substantially compensate the nominal free space propagation path loss.

32. The method of claim 29 wherein the analog integrating enables to compensate at least part of the obstacle-originated loss.

33. The method of claim 29 wherein the analog integrating enables to compensate at least part of the loss caused by variations of radar cross section.

34. The method of claim 26 wherein, for samples of at least one range cell, the number $N_a$ of analog integration cycles is selected in accordance with a difference between dynamic range of the signal and an available dynamic range of the analog/digital converter.

35. The method of claim 26 wherein an overall number of integration cycles varies for samples of different range cells.

36. The method of claim 35 wherein, for samples of each range cell defined by an integration plan an overall number of integration cycles N(t) for different range cells is split into $N_a(t)$ of analog integration cycles and $N_d(t)$ of digital integration cycles substantially complying the equation $N(t)=N_a(t) \times N_d(t)$.

37. The method of claim 36 wherein the defined by an integration plan number N(t) of integration cycles for different range cells substantially complies with the following equation:

$$N(t) = \left(\frac{t}{t_0}\right)^4 10^{[SNR_t - SNR(t_0)]/10}$$

$$\equiv N_0 \left(\frac{t}{t_0}\right)^4$$

where $t_0$ is a starting receive time, and $N_0$ is the number of integration cycles for $t=t_0$, given by: $N_0 = 10^{[SNR_t - SNR(t_0)]/10}$.

38. The method of claim 36 wherein respective numbers of analog and digital integration cycles is configured in accordance with desired SNR profile.

39. The method of claim 38 wherein the number of analog integration cycles is configured to provide a range independent signal.

40. The method of claim 36 wherein a number of integration cycles for samples of given range cells is less than a number of integration cycles for samples of more distant range cells.

41. The method of claim 38 wherein the desired SNR profile is maximized for desired sub-range.

42. The method of claim 41 wherein the desired sub-range is predefined.

43. The method of claim 38 wherein said number of integration cycles is configured in accordance with a frame rate of the radar.

44. The method of claim 26 wherein the analog integrating is provided with a number of integration cycles variable for samples of different range cells.

45. The method of claim 26 wherein the analog integrator is configured to provide integration with a number of integration cycles in accordance with a dynamic range of the analog/digital converter.

46. The method of claim 26 wherein the analog integrator is configured to provide integration with a number of integration cycles in accordance with conversion rate of the analog/digital converter.

47. The method of claim 35 wherein a relationship between numbers of analog and digital integration cycles for different range cells is pre-defined.

48. The method of claim 47, wherein said relationship is adapted to desired SNR profile.

49. The method of claim 35 comprising adapting the numbers of analog and digital integration cycles for samples from different range cells in accordance with desired SNR profile with the help of an adapting algorithm.

50. The method of claim 35 comprising configuring the numbers of analog and digital integration cycles for samples of different range cells in accordance with desired SNR profile with the help of a learning algorithm.

51. For use in a radar, a program storage device readable by machine, tangibly embodying a program of instructions executable by the machine to perform method steps for signal acquisition with integrating at least one received signal whereby providing compensation of a signal loss; the method comprising:
（a) sampling the received signal giving rise to samples of different range cells;
(b) analog integrating of said samples during $N_a>1$ analog integration cycles whereby providing compensation of at least part of the signal loss and giving rise to analog integrated samples;
(c) analog/digital converting said analog integrated samples into digital samples;
(d) digital integrating said digital samples during $N_d$ digital integration cycles whereby substantially providing the rest of desired signal loss compensation.

52. For use in a radar, a computer program product comprising a computer useable medium having computer readable program code embodied therein for signal acquisition with integrating at least one received signal whereby providing compensation of a signal loss; the computer program product comprising:
(a) computer readable program code for causing the computer to sample the received signal giving rise to samples of different range cells;
(b) computer readable program code for causing the computer to analog integrating of said samples during $N_a>1$ analog integration cycles whereby providing compensation of at least part of the signal loss and giving rise to analog integrated samples;
(c) computer readable program code for causing the computer to analog/digital converting said analog integrated samples into digital samples;
computer readable program code for causing the computer to digital integrating said digital samples during $N_d$ digital integration cycles whereby substantially providing the rest of desired signal loss compensation.

* * * * *